Sept. 22, 1959 P. H. EMMETT ET AL 2,905,536
METHOD FOR STUDYING CHEMICAL REACTIONS
Filed Feb. 27, 1956 2 Sheets-Sheet 2

INVENTORS
PAUL H. EMMETT
RICHARD J. KOKES
HUGH H. TOBIN, JR.
BY

THEIR ATTORNEY

United States Patent Office 2,905,536
Patented Sept. 22, 1959

2,905,536

METHOD FOR STUDYING CHEMICAL REACTIONS

Paul H. Emmett and Richard J. Kokes, Baltimore, Md., and Hugh H. Tobin, Jr., Pittsburgh, Pa., assignors to Gulf Research & Development Company, Pittsburgh, Pa., a corporation of Delaware Application February 27, 1956, Serial No. 568,030

5 Claims. (Cl. 23—232)

This invention relates to a method and an apparatus for studying chemical reactions and more particularly to a method and apparatus with which products of a chemical reaction can be chromatographically separated and analyzed.

In studying catalytic reactions in which vapors are passed over a solid catalyst and in studying homogeneous reactions in which vapors are passed through a hot reaction tube under controlled conditions, the procedure in the past has been to collect samples of the products and then to determine their nature by a complex series of distillations and analyses by chemical, mass spectographic, infrared and ultraviolet techniques. The prior art procedure is costly and time consuming. It also has the disadvantage that it gives the average of results for the entire period of a reaction being studied. We have now discovered a method and apparatus for studying chemical reactions which greatly shortens the time required to obtain results and reduces the work required for obtaining them.

The method of our invention in general comprises passing a reaction charge in a stream of an inert carrier gas through a reaction zone under selected reaction conditions, passing the carrier gas stream containing reaction products directly from the reaction zone into a chromatographic separation zone and detecting separated reaction products as they emerge from the chromatographic separation zone.

The apparatus of the invention comprises in series a chemical reaction chamber and a chromatographic column. The apparatus is provided with means for introducing a stream of inert carrier gas and means for introducing a reaction charge to the reaction chamber and means for delivering the reaction product and carrier gas directly from the reaction chamber into the chromatographic column. The chromatographic column is provided with temperature control means and means for detecting emerging separated reaction products. In the preferred embodiment of the apparatus the reaction chamber contains a catalyst, the chromatographic column is a gas-liquid partition chromatographic column and the means for detecting separated reaction products is a thermal conductivity cell associated with a recording potentiometer.

Figure 1:
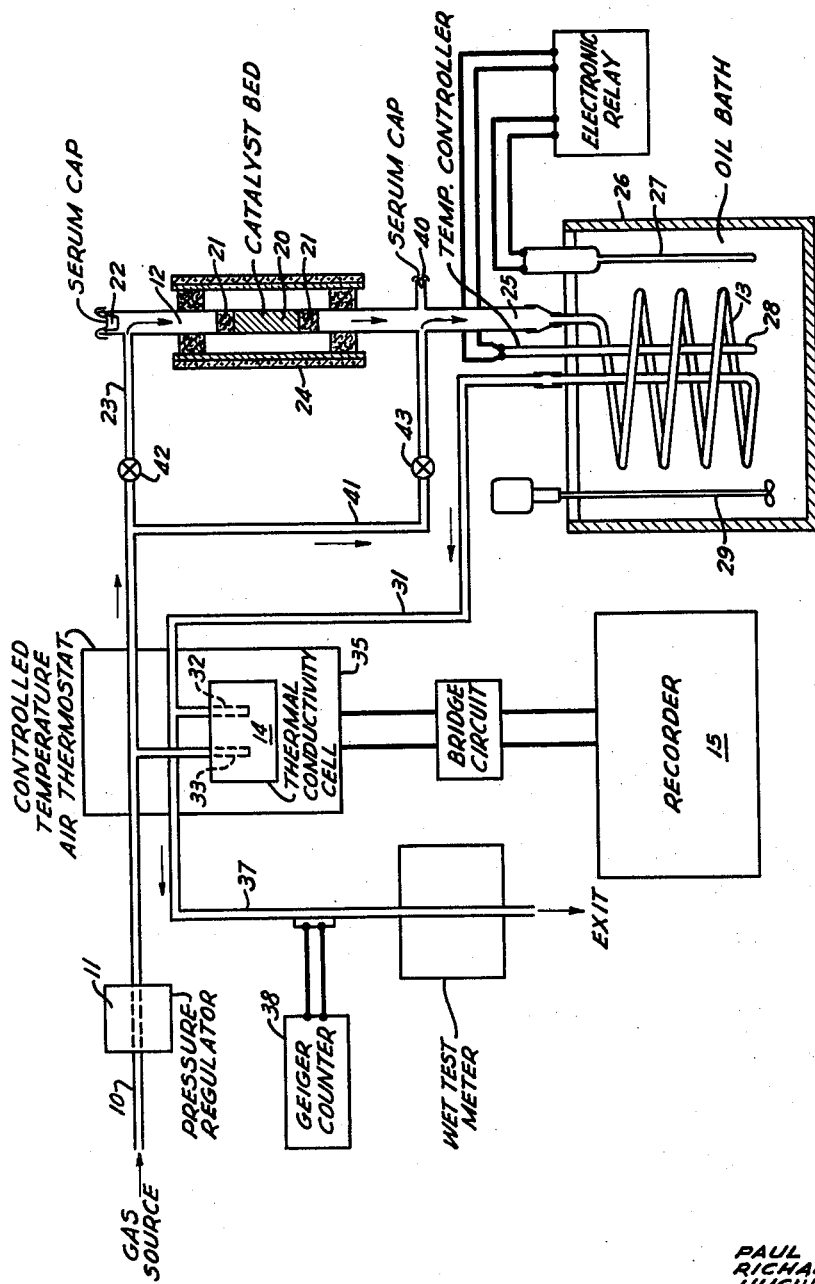
Figure 2:
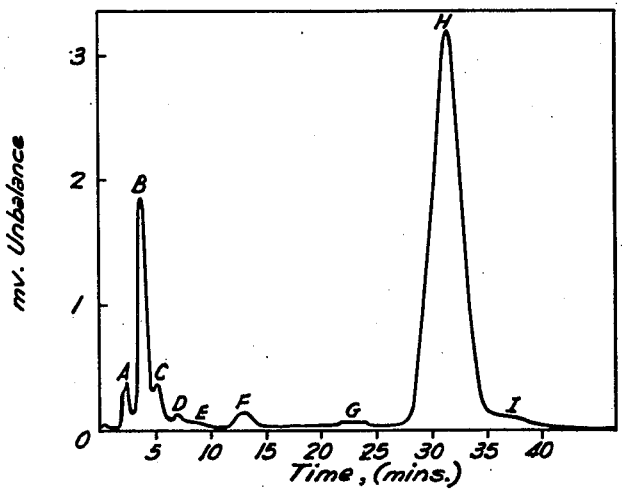
Figure 3:
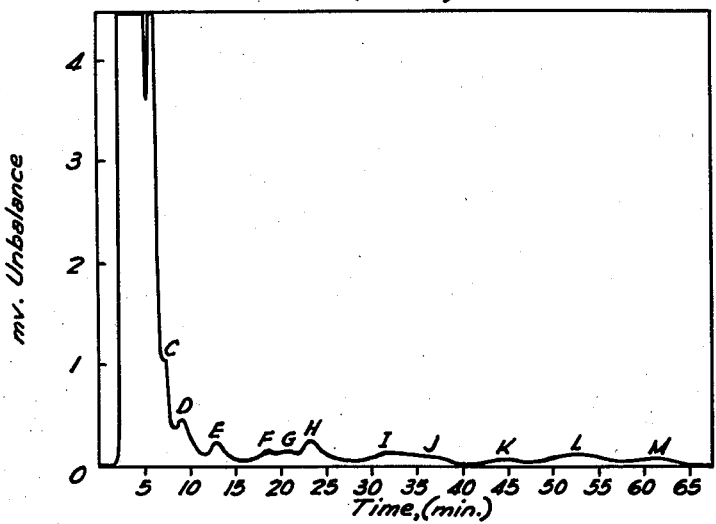
Figure 4:
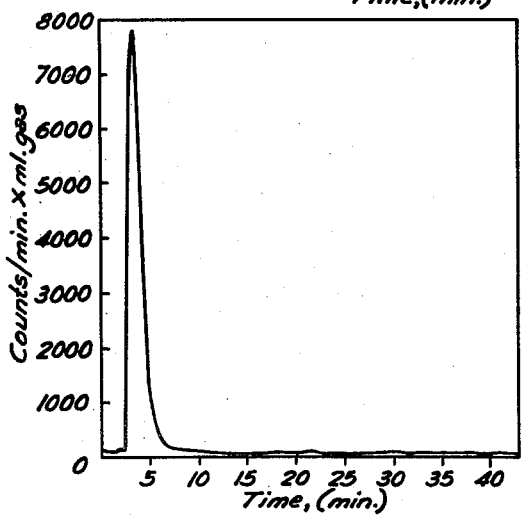

The method and apparatus will be further described with reference to the drawings of which Figure 1 is a diagrammatic representation of a preferred embodiment of the apparatus, Figures 2 and 3 are thermal conductivity chromatograms of reactions studied in accordance with the invention, and Figure 4 is a plot of time vs. Geiger counter readings for a radioactive tracer reaction studied in accordance with the invention.

The chromatographic technique preferably employed in our method and apparatus is the technique of gas-liquid partition or thin film chromatography which has been developed in recent years for analyzing small samples of fluid mixtures. The technique has been described in the literature, for example in the article by Litchtenfels et al., Analytical Chemistry, volume 27, Number 10, October 1955, pages 1510–13 and in the references cited therein.

To analyze a volatile mixture by gas-liquid partition chromatography a sample of the mixture is injected into the end of a long narrow column packed with an inert non-porous granular material on which has been deposited a coating of a high boiling organic liquid such as dioctyl phthalate. The column is then eluted with an inert carrier gas such as helium or hydrogen. The components of the mixture partition between a gas phase in the intersticial spaces of the column and a liquid phase absorbed in the high boiling organic solvent coating of the granular solid particles. This causes the components of the mixture to move through the column with individual velocities which are less than that of the carrier gas. The velocity with which a particular component moves is dependent upon is partition coefficient, the latter being a measure of the solubility of the component in the stationary liquid phase. Since different compounds have different partition coefficients, the components of the mixture move through the column at different speeds and if the column is long enough the components emerge one by one from the column, usually in the order of boiling points for a homologous series. The emerging components are detected by suitable means for detecting vapor concentrations in a gas stream. The most commonly used detecting means and the most suitable for the method of our invention is a thermal conductivity cell connected with a recording potentiometer.

An essential feature of the method of our invention is the passage of a continuous stream of inert carrier gas in series first through a chemical reaction zone from which it elutes reaction products and then directly into a gas elution chromatographic column, preferably a gas-liquid partition chromatographic column. The successful practice of this technique is made possible by a fact that we have discovered, namely, that a vaporized reaction charge and the reaction product vapor flow through a catalytic or thermal reaction zone in a substantially continuous and concentrated mass when introduced into the reaction zone and eluted therefrom with an inert carrier gas. It is this fact that makes it possible to pass the carrier gas and the eluted reaction product vapors directly into a chromatographic column and obtain the separate emergence of each reaction product from the chromatographic column so that each individual component can be detected.

The apparatus of Figure 1 is a preferred embodiment of our apparatus which comprises the combination of a catalytic reaction chamber and a gas-liquid partition chromatography separation column having associated therewith a thermal conductivity cell detecting means. The apparatus of Figure 1 comprises a carrier gas inlet means 10 by which a carrier gas such as hydrogen is charged to the apparatus, a pressure regulator 11 for providing a constant carrier gas pressure, a catalytic reactor 12 connected in series with an elongated coiled partition chromatographic tube or column 13 and a thermal conductivity cell 14 connected with a recording potentiometer 15. The catalytic reactor 12 contains a bed of catalyst 20 held in place by a suitable means such as pads of glass wool 21. Reactor 12 is provided with a reaction charge inlet means in the form of a rubber serum cap 22. A small amount of the charge for the reaction to be studied is injected into the reactor through the serum cap 22 by means of a hypodermic syringe and is carried into and through the catalyst bed by the carrier gas entering via line 23. The catalytic reactor is also provided with suitable heat control means which in the embodiment of the drawing takes the form of an electric heater 24 surrounding the reaction chamber.

The lower end of the reaction chamber of Figure 1 connects directly by the vapor passage 25 with the coiled chromatographic column 13 positioned within a constant temperature oil bath tank 26. The constant temperature of the oil bath tank is maintained by means of the heater 27, temperature controller 28 and the stirrer 29. In the preferred apparatus of the drawing, column 13 is a coil of stainless steel tubing. The column at its outlet end connects via line 31 with the thermal conductivity cell 14. This cell has a test channel 32 for the gas stream being detected and a reference channel 33 connected with the carrier gas line 10. The thermal conductivity cell, as well as the carrier gas line and the product line in the region of the thermal conductivity cell, are enclosed within a constant temperature air bath 35. The thermal conductivity cell, in a manner well-known is the art, is connected with a Wheatstone bridge circuit 33 in which is balanced for the thermal conductivity of the carrier gas being used and which shows an unbalance when a gas other than the carrier gas passes through the testing channel of the cell. The bridge circuit is connected with a recording potenitometer 15 that continuously plots against time the unbalance of the Wheatstone bridge caused by the passage of substances other than carrier gas through the testing channel. A plot of this kind is shown in Figure 2 and will be explained more fully hereinafter.

In one embodiment of our apparatus the product outlet line 37 following the thermal conductivity cell passes through a Geiger counter 38 adapted for measuring the radioactivity of flowing gases as described in the article by J. T. Kummer, Nucleonics, vol. 3, No. 1, page 27 (1948). This embodiment of the apparatus can be used in studying reactions in which the radioactive tracer technique is used. An especially advantageous technique in accordance with the invention is the measurement of both thermal conductivity and radioactivity of the product vapor stream. We preferably accomplish this result by placing the thermal conductivity cell and the Geiger counter in series along the exit gas line as shown in Figure 1 and connecting the thermal conductivity cell bridge circuit and the Geiger counter analyzing cell to a single continuous recorder of the dual pen type.

Another feature of the preferred embodiment of the apparatus is the provision of means for calibrating the separation portion of the apparatus. This means includes the lower serum cap 40 by means of which a gas or liquid mixture of known composition can be inserted directly into the chromatographic column and includes the carrier gas by-pass line 41 and valves 42 and 43. When a known mixture is introduced at inlet 40 for calibrating the chromatographic column the valve 42 is closed and valve 43 is opened to cause the carrier gas to pass via line 41 directly into the chromatographic column. Valves 42 and 43 can also be used to cause the carrier gas to by-pass the reaction chamber and flow directly into the chromatographic column during a reaction study after the reaction products have been completely eluted from the reaction chamber.

In carrying out our method, for example in the study of the catalytic cracking of hydrocarbons over a silica-alumina catalyst in the apparatus described, a micro quantity (several cubic millimeters of a liquid charge or several cubic centimeters of a vapor charge) of the hydrocarbon charge is injected into a flowing stream of a carrier gas such as hydrogen through the charge inlet 22 of the apparatus. The small volume of hydrocarbon vapor flows in the stream of carrier gas through the reactor and the chromatographic column. As we have already mentioned, the reactant vapors travel through the reactor in a substantially continuous and compact volume. They issue from the reaction zone substantially undiluted by the carrier gas. This has important advantages in our process. Thus, each component of the reaction charge flows through the reaction chamber at about the same uniform rate. Each catalyst particle is in contact with the reactants for about the same length of time. The length of time that the reactants are in contact with the catalyst thus depends on the volume of the catalytic reaction zone for any constant flow rate of carrier gas.

A further understanding of the invention can be obtained from the following illustrative example of the study of a catalytic cracking reaction according to the method of the invention.

*Example I*

A reaction charge consisting of 0.027 cc. of liquid 2,3-dimethyl butane was injected into the catalytic reactor of our apparatus containing 1 cc. of M–46 Houdry type silica-alumina cracking catalyst maintained at a temperature of 534° C. The reactor had been purged with hydrogen before introducing the reaction charge. The carrier gas, hydrogen, was introduced at a rate of 38.5 cc. per minute. The reaction products of the cracking reaction were introduced directly into the chromatographic column containing granular kieselguhr having a surface coating of dioctyl phthalate. The oil bath surrounding the chromatographic column was maintained at 34° C. The separated reaction products were detected by the thermal conductivity cell as they emerged from the chromatographic column. A plot of the thermal conductivity cell readings against time is shown in Figure 2 of the drawing. The peaks of the curve are indicated in the drawing by capital letters and they correspond to the components of the reactor effluent as follows:

A—air, $CH_4$, $C_2H_4$, $C_2H_6$
B—$C_3H_6$, $C_3H_8$
C—i=$C_4H_{10}$
D—i=$C_4H_8$, n-$C_4H_{10}$, butene-1
E—cis and trans 2-butene
F—i-pentane
G—2-methyl-2-butane or 2,2-dimethylbutane
H—the residual 2,3-dimethylbutane
I—4-methyl-cis and trans-2-pentene, 2,3-dimethyl-1-butene or 3-methylpentane The results of Example I show that we have developed a method and apparatus by means of which one can obtain within a few minutes after the completion of a chemical reaction an identification of the types and amounts of products formed and this result is accomplished with a minimum of effort on the part of the operator.

In Example I we have described one particular reaction that can be studied by our method and with our apparatus, namely, the catalytic cracking of a hydrocarbon compound. It should be understood that the method and apparatus are adapted to the study of many types of chemical reactions carried out at low or high pressures and temperatures, including catalytic reactions, thermal reactions and reactions carried out in the presence of radiation. For the latter types of reactions, the catalyst chamber in the apparatus of the drawing can be replaced by an empty tube.

The technique can be readily adapted for radioactive tracer reactions. We have explained above that the apparatus can include a Geiger counter through which the exit gases are passed as shown in Figure 1. The tracer technique has been employed in the process of our invention as described in the following example.

*Example II*

A 50–50 mixture of ethylene and propylene passed in a stream of hydrogen over the silica-alumina cracking catalyst at 400° C. as described in Example I yielded the thermal conductivity plot shown in Figure 3 of the drawing. In order to determine whether the products corresponding to the peaks in Figure 3 were formed by the polymerization of propylene and not by the polymerization of ethylene with itself or with propylene, a tracer reaction in accordance with the invention was carried out. The results of the tracer run are shown as a plot of Geiger counter readings against time in Figure 4 and show that the ethylene did not participate appreciably in the reaction under the particular conditions used. In the tracer reaction a 50-50 mixture of propylene and radioactive ethylene was injected into the catalytic reaction chamber and was eluted therefrom and passed through the chromatographic column with carrier gas in the manner described in Example I. However, the exit gases were passed through a Geiger counter designed for measuring the radioactivity of flowing gases and having a recorder connected therewith. Figure 4 is a plot of Geiger counter readings against time for products of the tracer reaction. It shows that the radioactivity in the exit gas was at a point corresponding to ethylene and that under the conditions of this run, no detectable amount of ethylene entered into the formation of the polymer products indicated by the peaks C through M in Figure 3.

The results of Example II show the important advantages obtained through the combination and interaction of a catalytic reaction, a chromatographic separation of reaction products and the measurement of radioactivity of the exit gas stream.

In the examples above we have described the use of gas-liquid partition chromatography in the method of the invention. The use of partition chromatography is preferred particularly because of the sharp separations of vapor mixtures that it makes possible. However, the principles of the invention extend to the use of gas or vapor phase chromatography in general. By gas chromatography we mean to include both gas-liquid partition chromatography, which we have already explained, and gas elution adsorption chromatography. In the latter technique a mixture of gaseous materials is separated on the basis of the differences in affinity for a solid adsorbent material rather than on the basis of differences in partition coefficients as in partition chromatography. Both of these species of vapor phase chromatography are suitable for the practice of our invention because both employ a carrier gas which can be used to sweep a reactant charge and the reaction products through a reaction chamber and into and through the chromatographic separation chamber.

When a partition chromatographic column is used in the practice of the invention, the column can employ any of the granular solids that have been used for partition chromatography. Preferably the solid particles forming the column are non-porous materials which are not chromatographically active adsorbents as otherwise the effects of adsorption chromatography and partition chromatography would be superimposed upon each other and this might prevent the obtaining of sharply defined fractions. The partitioning liquid which coats the particles can be selected from the many high boiling organic solvents that are suitable for use in partition chromatography. Suitable liquids that are well-known for this purpose include high boiling esters such as dioctyl phthalate, dinonyl phthalate, dioctyl sebacate, and other high boiling solvents such as paraffin wax, silicone fluids, ethylene oxide polymers, etc. In some instances one particular partitioning liquid may be superior to another for separating a particular mixture of reaction products.

The carrier gas can be any of the inert carrier gases known for partition chromatography provided of course that the gas has no adverse effect on the chemical reaction as it sweeps the reactants through the reaction chamber. Suitable gases include helium, hydrogen and nitrogen. The lower molecular weight gases are preferred when the apparatus includes a thermal conductivity cell as the detecting means.

If vapor phase adsorption chromatography is employed in lieu of partition chromatography, any of the well-known adsorbents for adsorption chromatography can be used including activated alumina, bauxite, silica gel, etc. The eluting gas or carrier gas can be the same as would be used in partition chromatography.

We have described the use of a thermal conductivity cell as the detecting means for our method and apparatus. This particular device is especially well suited for detecting and providing a continuous record of changes in composition of a gaseous stream. However, in some instances other detecting means may be preferred and can be used in accordance with the invention. Such other detecting means include a gas density meter, an infrared spectrometer, etc.

The practical applications of the method and apparatus of the invention are numerous. One important application is in the study of catalyst activity. With the method and apparatus of the invention the activity of a catalyst can be studied by exposing it to reaction conditions for predetermined lengths of time. Thus, aging studies of the catalyst can be made by applying the method of the invention after the catalyst has been brought to a certain age by flowing fresh charge through it. In addition the charge gas can be passed through the reaction zone at different space velocities to determine the effect of catalyst contact time on reactions. Our method and apparatus provide a valuable means for carrying out a great variety of exploratory catalytic work and for making fundamental studies of the mechanism of catalytic reactions.

Another important application of the method and apparatus is the analysis of mixtures that cannot in their original state be readily analyzed by the chromatographic technique. For example, it is sometimes difficult to analyze a mixture of hydrocarbons in the $C_4$ to $C_7$ range like the catalytic cracking product of Example I which contains both olefins and paraffins if the thermal conductivity peaks of certain of the olefins and paraffins occur at almost the same point in the chromatogram curve. This difficulty can be overcome in accordance with the invention by maintaining olefin hydrogenation conditions and placing a hydrogenation catalyst such as reduced iron in the reaction zone of our process, using hydrogen as the carrier gas, and introducing the mixture of olefins and paraffins into the stream of hydrogen in advance of the reaction zone. The reaction product including hydrogenated olefins is passed with the hydrogen carrier gas stream from the reaction zone directly into the chromatographic separation zone and a chromatogram of the separated product is obtained by our method. Then the chromatograms of the olefin-paraffin mixture, with and without hydrogenation, can be compared and an identification of the various components can be obtained. In this connection, it should be understood that by the term "inert" carrier gas we mean that the gas is inert with respect to the chromatographic separation. The carrier gas may however in some modifications of our process, as in the hydrogenation reaction modification described, have chemical reactivity in the reaction zone.

Obviously many modifications and variations of the invention as hereinbefore set forth may be made without departing from the spirit and scope thereof and therefore only such limitations should be imposed as are indicated in the appended claims.

We claim:
1. A method of conducting chemical reactions and separating reaction products comprising continuously passing a stream of carrier gas sequentially through a reaction zone under selected reaction conditions and a chromatographic separation zone, while so passing the carrier gas stream introducing a reaction charge into the carrier gas stream as an essentially compact mass therein upstream of the reaction zone, maintaining the reaction charge and/or the reaction products thereof in an essentially continuous and compact volume as they are carried by the carrier gas through the reaction zone and until they enter the chromatographic separation zone, whereby the components of the reaction charge and/or the reaction products thereof are carried through the chromatographic separation zone and emerge from the chromatographic separation zone with the carrier gas stream separated at least in part as to their time of emergence.

2. A method for studying chemical reactions which comprises continuously passing a stream of carrier gas sequentially through a reaction zone under selected reaction conditions and a chromatographic separation zone, while so passing the carrier gas stream introducing a reaction charge into the carrier gas stream as an essentially compact mass therein upstream of the reaction zone, maintaining the reaction charge and/or the reaction products thereof as they are carried by the carrier gas in an essentially continuous and compact volume as they pass through the reaction zone and until they enter the chromatographic separation zone, and detecting changes in a selected physical property of the carrier gas stream as it emerges from the chromatographic separation zone carrying the chromatographically separated reaction charge and/or reaction products thereof.

3. The method of claim 2, wherein said physical property is thermal conductivity.

4. A method for studying chemical reactions which comprises continuously passing a stream of carrier gas sequentially through a reaction zone under selected reaction conditions and a chromatographic separation zone, while so passing the carrier gas stream introducing a reaction charge into the carrier gas stream as an essentially compact mass therein upstream of the reaction zone, maintaining the reaction charge and/or the reaction products thereof as they are carried by the carrier gas in an essentially continuous and compact volume as they pass through the reaction zone and until they enter the chromatographic separation zone, and detecting changes in at least two distinct physical properties of the carrier gas stream as it emerges from the chromatographic separation zone carrying the chromatographically separated reaction charge and/or reaction products thereof, whereby identification of chromatographically separated components can be facilitated by comparison of the changes in at least two physical properties produced thereby.

5. The method of claim 4, wherein said reaction charge includes a radioactive component, and wherein one of said physical properties is radioactivity.

References Cited in the file of this patent

UNITED STATES PATENTS

| 2,398,818 | Turner | Apr. 23, 1946 |
| 2,662,846 | Montgomery et al. | Dec. 15, 1953 |

OTHER REFERENCES

Bradford et al.: "J. of the Inst. of Petroleum," vol. 41, No. 375, March 1955, pages 80–91.

Ray: "J. Appl. Chem.," 4, 21–25, 82–85 (1954).

Peaceful Uses of Atomic Energy, vol. 15, pages 3–15 (presented at Geneva, August 8–20, 1955), United Nations, New York, 1956.

Ambrose: J. of Scientific Instruments, vol. 23, page 323 (1955).